(12) United States Patent
Wang

(10) Patent No.: US 12,229,682 B2
(45) Date of Patent: Feb. 18, 2025

(54) INTELLIGENT VASE SYSTEM, FLOWER RECOGNITION AND PRESENTATION METHOD AND ELECTRONIC APPARATUS

(71) Applicant: BOE TECHNOLOGY GROUP CO., LTD., Beijing (CN)

(72) Inventor: Ran Wang, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 443 days.

(21) Appl. No.: 17/629,354

(22) PCT Filed: Apr. 13, 2021

(86) PCT No.: PCT/CN2021/086851
§ 371 (c)(1),
(2) Date: Jan. 21, 2022

(87) PCT Pub. No.: WO2021/218624
PCT Pub. Date: Nov. 4, 2021

(65) Prior Publication Data
US 2022/0248880 A1 Aug. 11, 2022

(30) Foreign Application Priority Data
Apr. 28, 2020 (CN) .......................... 202010350790.1

(51) Int. Cl.
*G06K 9/00* (2022.01)
*A47G 7/06* (2006.01)
(Continued)

(52) U.S. Cl.
CPC .............. *G06N 3/084* (2013.01); *A47G 7/06* (2013.01); *G06T 7/11* (2017.01); *G06T 7/136* (2017.01);
(Continued)

(58) Field of Classification Search
CPC ........ G06N 3/084; G06N 20/00; G06V 10/82; G06V 10/40; G06V 10/764; G06V 20/64;
(Continued)

(56) References Cited

U.S. PATENT DOCUMENTS

| 2005/0185398 A1 | 8/2005 | Scannell |
| 2017/0262985 A1* | 9/2017 | Finn .......................... G06T 7/11 |
| 2020/0005062 A1* | 1/2020 | Iliev .................... G06V 10/7788 |

FOREIGN PATENT DOCUMENTS

| CN | 104573644 A | 4/2015 |
| CN | 107940292 A | 4/2018 |

(Continued)

OTHER PUBLICATIONS

Biabi, H., Mehdizadeh, S. A., & Salmi, M. S. (2019). Design and implementation of a smart system for water management of lilium flower using image processing. Computers and electronics in agriculture, 160, 131-143. (Year: 2019).*

(Continued)

*Primary Examiner* — Gregory A Morse
*Assistant Examiner* — Kevin M Coomber
(74) *Attorney, Agent, or Firm* — HOUTTEMAN LAW LLC

(57) ABSTRACT

One or more embodiments of the present disclosure provide an intelligent vase system, a flower recognition and presentation method for an intelligent vase system, and an electronic apparatus. The intelligent vase system includes: a vase body; a flower recognition device configured to: acquire a flower image of a flower inserted into the vase body, perform an object extraction on the flower image to obtain at least one object flower image, perform a flower recognition on the object flower image to obtain a flower recognition result, and acquire presentation information of an object flower based on the flower recognition result; and a display device, which (Continued)

is on the vase body, in communication with the flower recognition device, and configured to display the presentation information.

20 Claims, 5 Drawing Sheets

(51) Int. Cl.
*G06N 3/084* (2023.01)
*G06T 7/11* (2017.01)
*G06T 7/136* (2017.01)
*G06T 7/187* (2017.01)
*G06T 7/194* (2017.01)
*G06T 7/70* (2017.01)
*G06V 10/28* (2022.01)
*G06V 10/82* (2022.01)
*G06V 20/10* (2022.01)
*G06V 20/64* (2022.01)

(52) U.S. Cl.
CPC .............. *G06T 7/187* (2017.01); *G06T 7/194* (2017.01); *G06T 7/70* (2017.01); *G06V 10/28* (2022.01); *G06V 10/82* (2022.01); *G06V 20/188* (2022.01); *G06V 20/64* (2022.01); *G06T 2207/20081* (2013.01); *G06T 2207/20084* (2013.01)

(58) Field of Classification Search
CPC .................. G06V 20/188; G06V 10/28; G06T 2207/20081; G06T 2207/20084; G06T 7/187; G06T 7/136; G06T 7/194; G06T 7/11; G06T 7/70; A47G 7/06
See application file for complete search history.

(56) References Cited

FOREIGN PATENT DOCUMENTS

| | | | |
|---|---|---|---|
| CN | 108171275 A | | 6/2018 |
| CN | 108898059 A | | 11/2018 |
| CN | 109581883 A | | 4/2019 |
| CN | 110730547 A | | 1/2020 |
| KR | 20170041329 A | * | 4/2017 |
| WO | WO-2021042690 A1 | * | 3/2021 ........... G06T 7/0012 |

OTHER PUBLICATIONS

M. A. Rahman, S. P. Paul, M. Das, M. M. Hossain, R. Haque and M. A. Rahman, "Convolutional Neural Networks based multi-object recognition from a RGB image," 2019 International Conference on Electrical, Computer and Communication Engineering (ECCE), Cox'sBazar, Bangladesh, 2019, pp. 1-6 (Year: 2019).*

Otsu, N. (1975). A threshold selection method from gray-level histograms. Automatica, 11(285-296), 23-27. (Year: 1975).*

I. Gogul and V. S. Kumar, "Flower species recognition system using convolution neural networks and transfer learning," 2017 Fourth International Conference on Signal Processing, Communication and Networking (ICSCN), Chennai, India, 2017, pp. 1-6 ( Year: 2017).*

* cited by examiner

INTELLIGENT VASE SYSTEM, FLOWER RECOGNITION AND PRESENTATION METHOD AND ELECTRONIC APPARATUS

CROSS REFERENCE TO RELATED APPLICATIONS

This is a National Phase Application filed under 35 U.S.C. 371 as a national stage of PCT/CN2021/086851 filed on Apr. 13, 2021, an application claiming the priority of the Chinese Patent Application No. 202010350790.1 filed on Apr. 28, 2020, the content of each of which is incorporated herein by reference in its entirety.

TECHNICAL FIELD

One or more embodiments of the present disclosure relate to the technical field of internet of things, and in particular to an intelligent vase system, a flower recognition and presentation method, and an electronic apparatus.

BACKGROUND

At present, a vase is a vessel used for holding beautiful objects, such as flowers. Most of vases are made of ceramics or glass, and have beautiful and smooth appearance. The vase, which is an ornament, is an important object for improving indoor visual effect.

SUMMARY

A first aspect of the present disclosure provides an intelligent vase system including: a vase body; a flower recognition device configured to: acquire a flower image of a flower inserted into the vase body; perform an object extraction on the flower image to obtain at least one object flower image; perform a flower recognition on the object flower image to obtain a flower recognition result; and acquire presentation information of an object flower based on the flower recognition result; and a display device, which is on the vase body, in communication with the flower recognition device, and configured to display the presentation information.

In one embodiment, the intelligent vase system further includes a camera, which is on the vase body, in communication with the flower recognition device, and configured to capture the flower image of the flower inserted into the vase body and transmit the flower image to the flower recognition device.

In one embodiment, the flower recognition device is further configured to: process the flower image to obtain a gray image; perform a threshold segmentation and a binarization processing on the gray image to obtain a binary image; acquire at least one connected domain in the binary image; and calculate a central position coordinate of the connected domain, and mark the object flower image in the flower image based on the central position coordinate.

In one embodiment, the flower recognition device is further configured to: segment the gray image according to an optimal threshold.

In one embodiment, to obtain the optimal threshold, the flower recognition device is further configured to: segment the gray image into an object area and a background area according to an initial threshold; calculate an object area pixel gray average value of the object area, a background area pixel gray average value of the background area, and a full image pixel gray average value of the gray image; calculate a pixel variance between the object area and the background area according to the object area pixel gray average value, the background area pixel gray average value and the full image pixel gray average value; and change the initial threshold and recalculate the pixel variance, and select a threshold with the maximum pixel variance as the optimal threshold.

In one embodiment, the flower recognition device is further configured to: perform the flower recognition on the object flower image in response to a confirmation instruction from a user; or acquire the flower image again in response to a return instruction from the user, and extract the object flower image.

In one embodiment, the flower recognition device is further configured to: obtain the flower recognition result according to the object flower image and a pre-trained flower recognition model.

In one embodiment, to obtain the pre-trained flower recognition model, the flower recognition device is further configured to: acquire a sample image set and a label corresponding to each sample image in the sample image set; wherein the sample image set includes a sample image with flowers displayed thereon; and train a preset convolutional neural network by using a machine learning method based on the sample image set, the label corresponding to each sample image in the sample image set, a preset classification loss function and a preset back propagation algorithm, to obtain the flower recognition model.

In one embodiment, the flower recognition device is further configured to: acquire a plurality of initial sample images; preprocess the initial sample images by using a data standardization method, to obtain sample images; and construct the sample image set according to the sample images.

In one embodiment, the presentation information includes flower video presentation information and flower text presentation information; and the flower recognition device is further configured to: transmit the flower video presentation information and the flower text presentation information to different display devices for display.

In one embodiment, the intelligent vase system further includes a turntable on the bottom of the vase body; and a motor, which is connected to the turntable, in communication with the flower recognition device, and configured to receive a rotation control instruction generated by the flower recognition device and drive the turntable to rotate based on the rotation control instruction, so as to realize the rotation of the vase body.

In one embodiment, the intelligent vase system further includes an infrared sensor inside a vase opening of the vase body, in communication with the flower recognition device, and configured to collect an insertion or pull-out state of the flower, generate a corresponding signal and transmit the signal to the flower recognition device, so that the flower recognition device generates a control signal according to the signal indicating the insertion or pull-out state to control playing of the presentation information.

A second aspect of the present disclosure provides a flower recognition and presentation method for an intelligent vase system, the flower recognition and presentation method including: acquiring, by a flower recognition device, a flower image of a flower inserted into a vase body; performing, by the flower recognition device, an object extraction on the flower image to obtain at least one object flower image; performing, by the flower recognition device, a flower recognition on the object flower image to obtain a flower recognition result; acquiring, by the flower recognition device, presentation information of an object flower based on the flower recognition result and transmitting the presentation information to a display device; and displaying the presentation information on the display device.

In one embodiment, the flower recognition and presentation method further includes: collecting, by a camera, the flower image of the flower inserted into the vase body; and transmitting the flower image to the flower recognition device.

In one embodiment, the performing an object extraction on the flower image to obtain at least one object flower image includes: processing the flower image to obtain a gray image; performing a threshold segmentation and a binarization processing on the gray image to obtain a binary image; acquiring at least one connected domain in the binary image; and calculating a central position coordinate of the connected domain, and mark the object flower image in the flower image based on the central position coordinate.

In one embodiment, the performing a threshold segmentation on the gray image includes: segmenting the gray image according to an optimal threshold.

In one embodiment, the flower recognition and presentation method further includes: segmenting the gray image into an object area and a background area according to an initial threshold; calculating an object area pixel gray average value of the object area, a background area pixel gray average value of the background area, and a full image pixel gray average value of the gray image; calculating a pixel variance between the object area and the background area according to the object area pixel gray average value, the background area pixel gray average value and the full image pixel gray average value; and changing the initial threshold and recalculate the pixel variance, and selecting a threshold with the maximum pixel variance as the optimal threshold.

In one embodiment, the flower recognition and presentation method further includes: performing the flower recognition on the object flower image in response to a confirmation instruction from a user; or acquiring the flower image again in response to a return instruction from the user, and extracting the object flower image.

In one embodiment, the performing a flower recognition on the object flower image to obtain a flower recognition result includes: obtaining the flower recognition result according to the object flower image and a pre-trained flower recognition model.

In one embodiment, the flower recognition and presentation method further includes: acquiring a sample image set and a label corresponding to each sample image in the sample image set; wherein the sample image set includes a sample image with flowers displayed thereon; and training a preset convolutional neural network by using a machine learning method based on the sample image set, the label corresponding to each sample image in the sample image set, a preset classification loss function and a preset back propagation algorithm, to obtain the flower recognition model.

In one embodiment, the acquiring the sample image set includes: acquiring a plurality of initial sample images; preprocessing the initial sample images by using a data standardization method, to obtain sample images; and constructing the sample image set according to the sample images.

In one embodiment, the acquiring presentation information of the object flower based on the flower recognition result includes: acquiring flower video presentation information and flower text presentation information according to the flower recognition result; and transmitting the flower video presentation information and the flower text presentation information to different display devices for display.

A third aspect of the present disclosure provides an electronic apparatus, which includes a memory, a processor, and a computer program stored in the memory and executable on the processor, wherein the computer program, when executed by the processor, implements the flower recognition and presentation method for an intelligent vase system according to the second aspect of the present disclosure.

BRIEF DESCRIPTION OF DRAWINGS

In order to more clearly illustrate the technical solutions in one or more embodiments of the present disclosure or in the prior art, the drawings used in the description of the embodiments of the present disclosure or the prior art will be briefly described below. It is obvious that the drawings in the description below are only one or more embodiments of the present disclosure, and that other drawings may be obtained by one of ordinary skill in the art based on these drawings without inventive effort.

DETAIL DESCRIPTION OF EMBODIMENTS

Figure 1:
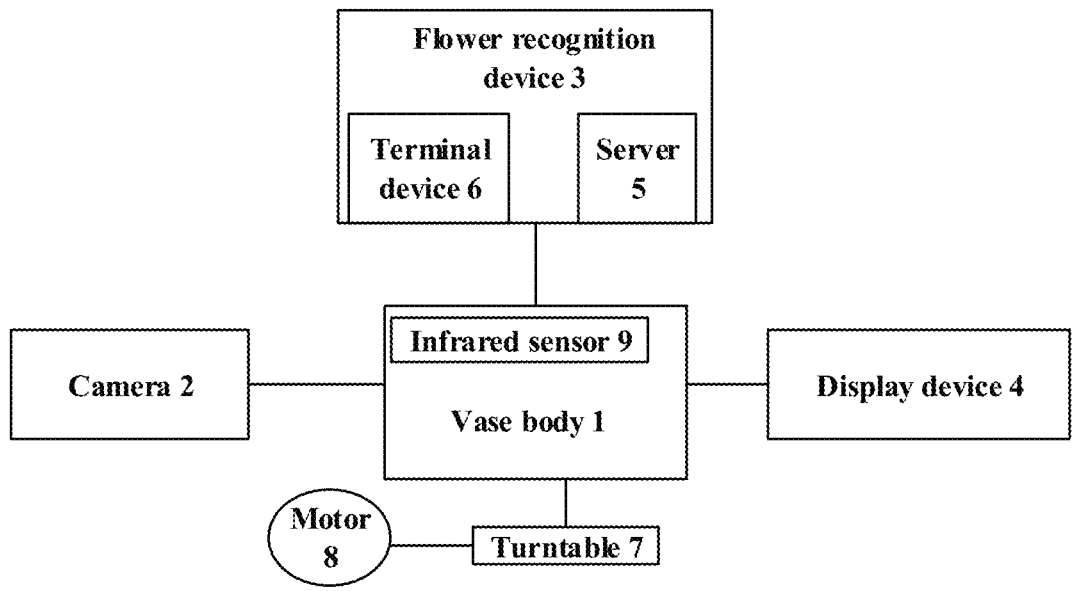
FIG. 1 is a schematic diagram of a structure of an intelligent vase system according to one or more embodiments of the present disclosure.

To make the objects, technical solutions and advantages of the present disclosure more apparent, the present disclosure will be described in further detail below with reference to exemplary embodiments and the accompanying drawings.

It is to be understood that unless otherwise defined, technical or scientific terms used in one or more embodiments of the present disclosure shall have the ordinary meaning as understood by one of ordinary skill in the art to which the present disclosure belongs. The terms "first", "second", and the like used in one or more embodiments of the present disclosure are not intended to indicate any order, quantity, or importance, but rather are used for distinguishing one element from another. The term of "comprising", "including", or the like, means that the element or item preceding the term contains the element or item listed after the term and its equivalent, but does not exclude other elements or items. The term "connected", "coupled", or the like is not limited to physical or mechanical connections, but may include electrical connections, whether direct or indirect connections. The terms "upper", "lower", "left", "right", and the like are used only for indicating relative positional relationships, and when the absolute position of an object being described is changed, the relative positional relationships may also be changed accordingly.

According to an intelligent vase system, a flower recognition and presentation method for an intelligent vase system, and an electronic apparatus that are provided by one or more embodiments of the present disclosure, a camera positioned on a vase body is used for collecting images of flowers (each of which refers to any ornamental plant) to be inserted into the vase body to obtain flower images, and then the camera is used for transmitting the collected flower images to a flower recognition device; after receiving the flower images, the flower recognition device is configured to: firstly, perform an object extraction on the flower images to extract individual posies (i.e., individual flowers) from the flower images as an object, thereby obtaining object flower images; and perform a flower recognition on the object flower images, thereby obtaining a flower recognition result; based on the flower recognition result, obtain presentation information that is used for introducing the flowers, such as an image, a text, a video, etc., which is sent to a display device for display. In this way, the vase in this embodiment not only may hold flowers, but also may comprehensively present the flowers held in the vase in an image, a text, a video, etc., such that the intelligent vase in this embodiment may meet the requirements of flower presentation in large-scale public places such as hotels, banks, exhibition halls and the like, thereby improving the target value proposition, and attracting the flow.

In the prior art, a vase may only be used as an ornament and has a single function. In order to meet the requirements of flower presentation in large-scale public places such as hotels, banks, exhibition halls and the like, one or more embodiments of the present disclosure provide an intelligent vase system.

FIG. 1 is a schematic diagram of a structure of an intelligent vase system according to one or more embodiments of the present disclosure. As shown in FIG. 1, the intelligent vase system includes a vase body 1, a camera 2, a flower recognition device 3, and a display device 4. The vase body 1 may be used for holding flowers. The camera 2 is provided on the vase body 1, and is configured to collect flower image(s) of flowers inserted into the vase body. The flower recognition device 3 is provided on the vase body 1, and is configured to: acquire the flower images; perform an object extraction on the flower images to obtain at least one object flower image; perform a flower recognition on the object flower image to obtain a flower recognition result; and acquire presentation information of an object flower based on the flower recognition result. The display device 4 is disposed on the vase body 1 and configured to display the presentation information.

In an embodiment of the present disclosure, the vase body 1, the camera 2, the flower recognition device 3, and the display device 4 communicate with each other through a wired connection or through a wireless connection.

In an embodiment of the present disclosure, the camera collects the flower images before a bouquet (i.e., a bunch of flowers) is placed in the vase body. Specifically, firstly, flowers are shot and recognized outside the vase body, and after the flowers are successfully recognized, the flowers are placed in the vase body for display. In an embodiment of the present disclosure, the camera may be only required to be placed on the back of the vase body, and the flowers are not required to be monitored in real time.

In the present embodiment, firstly, the camera 2 positioned on the vase body 1 is used for collecting images of flowers to be inserted into the vase body 1 to obtain flower images, and then the camera 2 is used for transmitting the collected flower images to the flower recognition device 3; after receiving the flower images, the flower recognition device 3 is configured to: perform an object extraction on the flower images firstly, to extract individual posies from the flower images as an object, thereby obtaining object flower images; and perform a flower recognition on the object flower images, thereby obtaining a flower recognition result; based on the flower recognition result, obtain presentation information that is used for introducing the flowers, such as an image, a text, a video, etc., which is sent to the display device for display. In this way, the vase in this embodiment not only may hold flowers, but also may comprehensively present the flowers held in the vase in an image, a text, a video, etc., such that the intelligent vase in this embodiment may meet the requirements of flower presentation in large-scale public places such as hotels, banks, exhibition halls and the like, thereby improving the target value proposition, and attracting the flow.

Optionally, in this embodiment, the flower recognition device 3 may be a single device, and includes a processor, a memory, and the like. The memory stores a large amount of flower information. After the processor performs the extraction on the object flower image, the processor extracts corresponding flower presentation information from the memory and transmits the flower presentation information to the display device for display.

Figure 2:
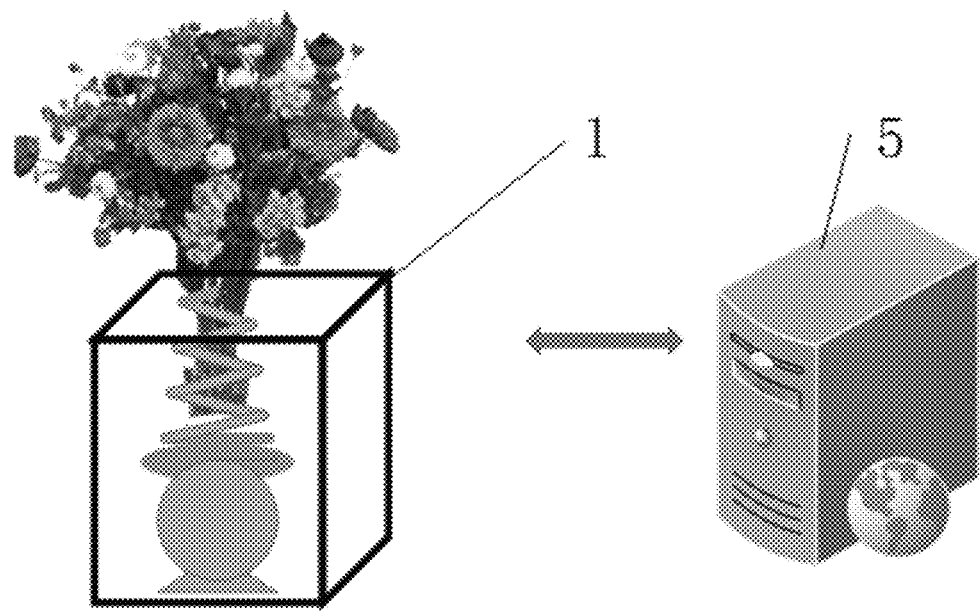
FIG. 2 is a schematic diagram of an application scenario of an intelligent vase system according to one or more embodiments of the present disclosure.

FIG. 2 is a schematic diagram of an application scenario of an intelligent vase system according to one or more embodiments of the present disclosure. As shown in FIG. 1, the flower recognition device 3 in this embodiment may also include a terminal device 6 and a server 5, where the terminal device 6 obtains a flower image and then performs object extraction on the flower image, transmits the extracted object flower image to the server 5 for flower recognition, and transmits the obtained presentation information of the object flower to the display device for display; or the terminal device 6 transmits the acquired flower image directly to the server for object extraction and flower recognition.

In an embodiment of the present disclosure, the flower image refers to a posy image (or an image of flower(s)). In an embodiment of the present disclosure, the object flower image refers to a posy image that is easily recognized. Accordingly, the intelligent vase system of the embodiments of the present disclosure shoots and recognizes the posies of the flowers. The intelligent vase system of the embodiments of the present disclosure may recognize ornamental flowers, such as peony, Chinese peony, *Chrysanthemum*, crape myrtle, Chinese rose, lily, plum blossom, jasmine, and the like.

In other embodiments of the present disclosure, the intelligent vase system may also shoot and recognize leaves and branches of the flowers, such that the intelligent vase system may recognize flowers or plants (e.g., scindapsus, succulent plants, etc.) that do not have posies.

In an embodiment of the present disclosure, the terminal device may be a mobile phone, a tablet computer, or the like.

In this way, the camera is not necessarily provided on the vase body 1 for shooting the flowers, and the shooting and recognition functions may be provided by the external terminal device.

Optionally, when the camera is used for collecting flower images, the camera 2 may be arranged on the back of the vase body 1, so that information of a user is prevented from being illegally collected if the camera 2 is placed on the front side of the vase body 1, thereby protecting privacy of the user. In some optional embodiments, a multi-object extraction algorithm is adopted to perform the object extraction on the flower image(s), so as to obtain an object flower image. The multi-object extraction algorithm may include a threshold segmentation algorithm, a maximum interclass variance method (OTSU), a multi-object extraction algorithm based on machine vision images, and/or the like.

Figure 3A:
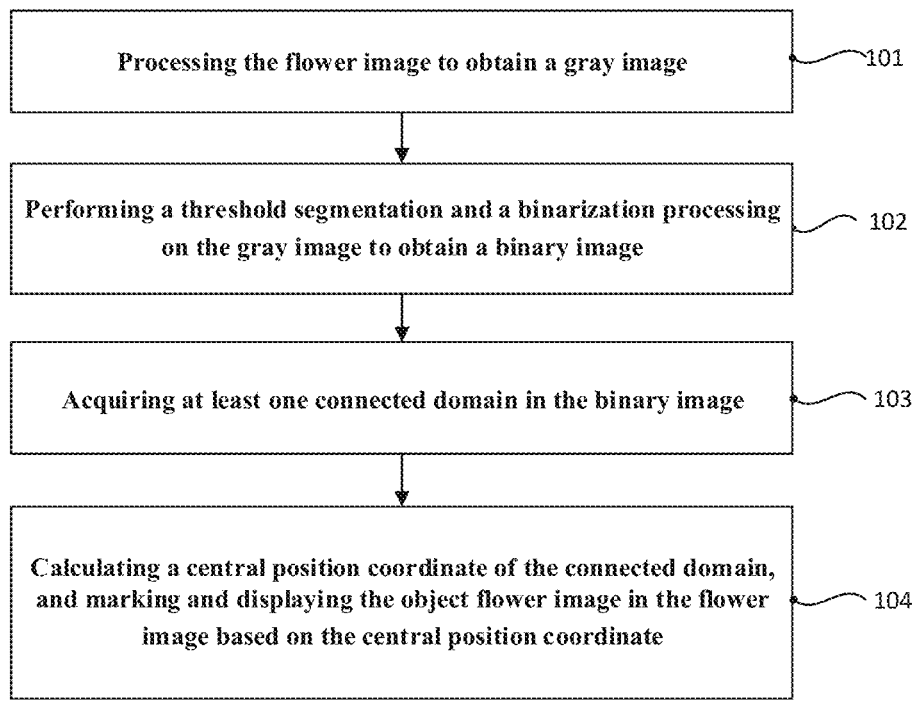
FIG. 3a is a schematic flowchart illustrating that a target (or an object) is extracted by a flower recognition device according to one or more embodiments of the present disclosure.

FIG. 3a is a schematic flowchart illustrating that an object is extracted by a flower recognition device according to one or more embodiments of the present disclosure. As shown in FIG. 3a, by taking the OTSU as an example, the flower recognition device 3 performs the object extraction on the flower image to obtain at least one object flower image, including the following steps 101 to 104.

Step 101 includes processing the flower image to obtain a gray image. Specifically, the gray image is obtained by performing a gray processing on the flower image.

Step 102 includes performing a threshold segmentation and a binarization processing on the gray image to obtain a binary image.

Specifically, in the present embodiment, the gray image is segmented based on a threshold; a pixel gray of each pixel of the gray image is acquired; the pixel gray of each pixel is compared with the threshold; if the pixel gray of the pixel is larger than the threshold, the pixel gray of the pixel is set as a first gray value; and if the pixel gray of the pixel is smaller than the threshold, the pixel gray of the pixel is set as a second gray value, thereby obtaining the binary image. The first gray value is 255 and the second gray value is 0, or the first gray value is 0 and the second gray value is 255.

The threshold segmentation is performed on the gray image by the flower recognition device 3, which includes: segmenting the gray image according to an optimal threshold.

Figure 3B:
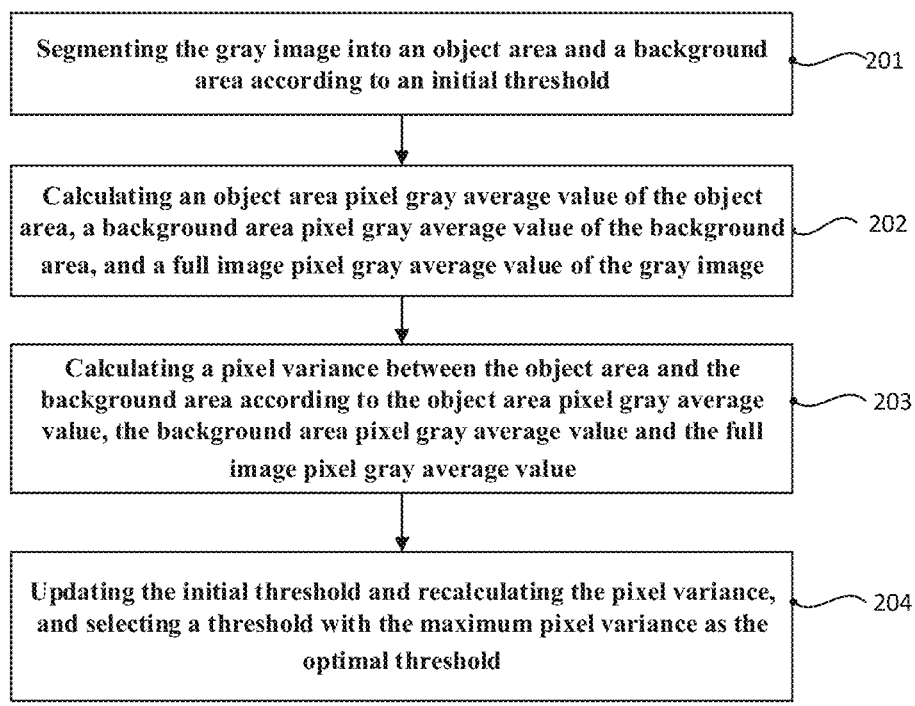
FIG. 3b is a schematic flowchart of obtaining an optimal threshold according to one or more embodiments of the present disclosure.

FIG. 3b is a schematic flowchart of obtaining an optimal threshold according to one or more embodiments of the present disclosure. As shown in FIG. 3b, the optimal threshold is obtained by the following steps 201 to 204.

Step 201 includes segmenting the gray image into an object area and a background area according to an initial threshold.

Firstly, the initial threshold is set. In this embodiment, the initial threshold may be a preset value. In other embodiments of the present disclosure, a minimum gray value of the gray image is obtained, and a sum of the minimum gray value and a preset step is used as the initial threshold. In an embodiment of the present disclosure, the object area is an area having pixels of the first gray value; and the background area is an area having pixels of the second gray value.

Step 202 includes calculating an object area pixel gray average value of the object area, a background area pixel gray average value of the background area, and a full image pixel gray average value of the gray image.

Step 203 includes calculating a pixel variance between the object area and the background area according to the object area pixel gray average value, the background area pixel gray average value and the full image pixel gray average value.

Step 204 includes updating (or changing) the initial threshold and recalculating the pixel variance, and selecting a threshold with the maximum pixel variance as the optimal threshold.

In an embodiment of the present disclosure, the initial threshold is updated by modifying the preset step, wherein the full image pixel gray average value is selected as the initial threshold for calculating the variance between the object area and the background area.

In this embodiment, if the object area pixel gray average value, the background area pixel gray average value and the full image pixel gray average value, which are obtained by segmenting based on a threshold, have the largest difference among them, and the segmentation result causes object bright point areas (for example, white point areas) to be relatively concentrated, the threshold is the optimal threshold. The segmentation is performed based on the optimal threshold to obtain the binary image, and subsequent processing is performed based on the binary image.

Step 103 includes acquiring at least one connected domain in the binary image.

In this embodiment, the object flower image may be determined by determining an approximate area for a single posy in the flower image by using a four neighborhood connected-domain approach.

Step 104 includes calculating a central position coordinate of the connected domain, and marking the object flower image in the flower image based on the central position coordinate.

In this embodiment, the maximum connected domain is selected as a reference, connected domains smaller than a preset percentage of the maximum connected domain are filtered out (in this embodiment, the preset percentage is 35%), and the remaining connected domains are segmented from the image, so as to obtain an object image corresponding to each connected domain. Then, a central position of the object image corresponding to each connected domain is calculated, to obtain the central position coordinate; the central position coordinate is combined with an original flower image; an expansion display through a 4×4 matrix is finally performed, to obtain a final object flower image; and the object flower image is marked on the display device through a rectangular frame.

In some optional embodiments of the present disclosure, when the bouquet inserted into the vase includes a plurality of kinds of flowers, the plurality of kinds of flowers may also be marked in the object flower image. If the object flower image marked currently meets the requirements of the user, the user may operate to perform the flower recognition. In this case, the flower recognition device 3 is further configured to: perform the flower recognition on the current object flower image in response to a confirmation instruction from the user.

In some optional embodiments of the present disclosure, if the object flower image does not include all kinds of flower or flower types that are interested by the user, it is necessary to repeat shooting the bouquet by adjusting a shooting angle to obtain another flower image and extract an object flower image again. In this case, the flower recognition device 3 is further configured to: acquire the flower image again in response to a return instruction from the user, and extract the object flower image.

In the above embodiments, the display device may be a touch display device, and thus, both the confirmation instruction and the return instruction from the user may be implemented by operating the touch display device by the user. In some optional embodiments of the present disclosure, the confirmation instruction and the return instruction from the user may be implemented by other forms, such as pressing a button.

In other embodiments of the present disclosure, the operation that the flower recognition device 3 performs the flower recognition on the object flower image to obtain a flower recognition result, may include: obtaining the flower recognition result according to the object flower image and a pre-trained flower recognition model.

In some optional implementations of the embodiment, the flower recognition model may be obtained by training a preset Convolutional Neural Network (CNN). The convolutional neural network may be an untrained multi-layer convolutional neural network or a multi-layer convolutional neural network which has not been completely trained. The convolutional neural network may include, for example, a convolution layer, a pooling layer, a fully-connected layer, and a loss layer. Additionally, a convolution layer other than the first convolution layer in the convolutional neural network may be connected to at least one convolution layer located before the convolution layer, to implement a selection for the first convolution layer. For example, the convolution layer other than the first convolution layer may be connected to all convolution layers located before the convolution layer; or the convolution layer other than the first convolution layer may be connected to some convolution layers located before the convolution layer.

It should be noted that the flower recognition model may be obtained by the flower recognition device 3 disposed on the vase body 1 or the terminal device disposed on the vase body 1, which is remotely communicated with and connected to a server, by performing the following training steps.

Firstly, a large number of sample images are acquired. Common images in a database are acquired as initial sample images, and the acquired initial sample images are preprocessed by adopting a data standardization method (e.g., standard deviation standardization), so that the processed data has normal distribution characteristics, with the mean value of 0 and the standard deviation of 1. The standard deviation standardization formula is given as:

$$y_i = \frac{x_i - \overline{x}}{s}, (i = 1, 2, \ldots, n)$$

where x and y are input values and output values, respectively; $\overline{x}$ is an average value of the input values, and s is a standard deviation of the input values. Sample images are obtained through preprocessing, and a sample image set is constructed according to the sample images so as to facilitate the training of the flower recognition model.

Then, the sample image set and a label corresponding to each sample image in the sample image set are obtained. A sample image with flowers displayed thereon may exist in the sample image set. A sample image without flowers displayed thereon may also exist in the sample image set. For the sample image with flowers displayed thereon, the label corresponding to the sample image may indicate the flower category which the flowers displayed on the sample image belong to. For the sample image without flowers displayed thereon, a label corresponding to the sample image may indicate that no flowers exist in the sample image. In addition, the sample image set and the labels corresponding to the sample images in the sample image set may be locally stored in an execution end of the training step (for example, in the flower recognition device 3 on the vase body 1) in advance. Alternatively, the sample image set and the labels may be stored in the server in advance, which is not limited in the present embodiment.

Finally, the convolutional neural network is trained by using a machine learning method based on the sample image set, the label corresponding to each sample image in the sample image set, a preset classification loss function and a preset back propagation algorithm, to obtain the flower recognition model. Here, in the training process, the flower recognition device 3 may input each sample image into the above convolutional neural network, to obtain a first recognition result corresponding to the sample image. The flower recognition device 3 may determine a difference between the first recognition result and the label corresponding to the sample image by using the preset classification loss function, and may adjust parameters (including a size of a convolution kernel and the number of convolution layers) in the convolutional neural network by using the preset back propagation algorithm according to the difference.

It should be noted that the above classification loss function may be any one of various loss functions for classification (e.g., a Hinge Loss function or a Softmax Loss function). In the training process, the classification loss function may restrict a mode and a direction of modifying the convolution kernel, and the training aim is to minimize a value of the classification loss function. Therefore, the parameters of the trained convolutional neural network are parameters corresponding to the minimum value of the classification loss function.

In addition, the back propagation algorithm may also be referred to as an error back propagation algorithm or an error inverse propagation algorithm. A learning process for the back propagation algorithm includes a forward propagation process and a back propagation process. In a feedforward network, an input signal is input through an input layer, calculated by a hidden layer, and output by an output layer. An output value is compared with a marked value. If there is an error, the error is propagated in reverse from the output layer to the input layer. In this process, a gradient descent algorithm (e.g., Stochastic Gradient Descent) may be used for adjusting neuron weights (e.g., parameters of the convolution kernel in the convolution layers, etc.).

In a specific embodiment, a sample image set of a uniform size is obtained after preprocessing. For example, a size of a sample image in the sample image set is 250×250×3, that is, a resolution of a sample image is 250×250, and the number of channels of a sample image is 3. Thereafter, the feature extraction is performed by using, for example, 32 and 64 convolution kernels of a size 5×5, respectively; a feature map extracted from the last convolution layer is down-sampled by using a maximum pooling method (e.g., the kernel is 2×2, a step is 2); for example, 1024 nodes are fully connected to an output of the previous pooling layer; data is randomly discarded with a probability of, for example, 35%; finally, a classification output is performed by using, for example, the Softmax regression. A universal back propagation method is adopted to train the model through a multi-layer feedforward neural network. That is, a Softmax loss function and a Mini-Batch Gradient Descent (MBGD) algorithm are adopted to train the model, and a batch size is set to be 128, for example. Finally, the trained flower recognition model is obtained.

In use, the extracted object flower image is input into the trained flower recognition model for flower recognition, and the flower recognition result is obtained. Optionally, the flower recognition result may include a flower category, which may be a category classified according to a species of the family, the genus, and the species of the flowers. The flower category may include, for example, peony, Chinese peony, *Chrysanthemum*, crape myrtle, Chinese rose, lily, plum blossom, jasmine, and the like. Alternatively, the flower category may also be a category classified according to the family or the genus of the family, the genus, and the species of the flowers. In an example where the flower category is a category classified according to the genus, the flower category may include, for example, the *Lilium* genus, the *Aloe* genus, the *Rhododendron* genus, the *Impatiens* genus, the *Hibiscus* genus, the *Chrysanthemum* genus, the crape myrtle genus, and the like.

In other embodiments of the present disclosure, the flower recognition device 3 is further configured to: acquire flower video presentation information and flower text presentation information according to the flower recognition result; and transmit the flower video presentation information and the flower text presentation information to different display devices for display.

For better presenting the flower recognition result, a dual-display device may be provided on the vase body 1 to display the flower video presentation information and the flower text presentation information, respectively. In order to reduce the system cost, a double-screen different-display function is realized by using a single-controller board card through a double Mobile Industry Processor Interface (MIPI) interface.

Figure 4A:
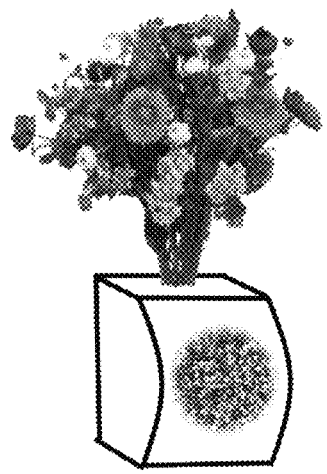
FIG. 4a is a schematic diagram of display (i.e., displaying) of a main screen according to one or more embodiments of the present disclosure.
Figure 4B:
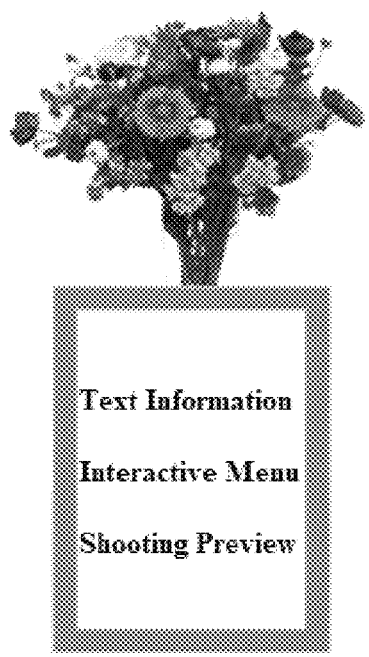
FIG. 4b is a schematic diagram of display (i.e., displaying) of a secondary screen according to one or more embodiments of the present disclosure.

FIG. 4a is a schematic diagram of display of a main screen according to one or more embodiments of the present disclosure, and FIG. 4b is a schematic diagram of display of a secondary screen according to one or more embodiments of the present disclosure. As shown in FIG. 4a, an Organic Light Emitting Diode (OLED) flexible display device is used as a main screen disposed on the front side of the vase body 1 and configured to present the flower video presentation information by means of the image quality of the main screen. As shown in FIG. 4b, a Liquid Crystal Display (LCD) is used as a secondary screen configured to present the flower text presentation information, display a flower recognition interface and a device management interface. The system may provide two different interfaces for video playing and information exchange on different screens respectively based on the Presentation class of Android, so that the double-screen different-display function is realized.

In other embodiments, the intelligent vase system according to embodiments of the present disclosure further includes a turntable and a motor. As shown in FIG. 1, the turntable 7 is arranged at the bottom of the vase body 1; the motor 8 is connected to the turntable 7 and configured to receive a rotation control instruction generated by the flower recognition device and drive the turntable to rotate based on the rotation control instruction, so as to realize the rotation of the vase body. Optionally, the turntable may be disposed inside the vase body 1, and a fixing bracket for fixing the bouquet is disposed on the turntable. The bouquet is rotated together with the fixing bracket as the turntable rotates, so that the flowers may be presented more comprehensively. Optionally, the turntable may also be arranged outside the vase body 1, and the bottom of the vase body 1 may be fixed on the turntable. The whole vase body 1 is rotated as the turntable rotates under the action of the motor, so that the flowers may be presented comprehensively.

Optionally, as shown in FIG. 1, the intelligent vase system further includes an infrared sensor 9 disposed inside a vase opening of the vase body 1, where the infrared sensor 9 is configured to collect an insertion or pull-out state of flower(s), generate a corresponding control signal, and transmit the control signal to the flower recognition device 3, so that the flower recognition device 3 generates a control signal according to the control signal indicating the insertion or pull-out state, so as to control playing and stopping of the presentation information. In this embodiment, when flower(s) are inserted in the vase body 1, the infrared sensor located at the vase opening detects the insertion of the flower(s), generates a flower insertion signal and transmits the flower insertion signal to the flower recognition device 3, such that the flower recognition device 3 begins to play the presentation information of the flower(s). When the flower(s) is(are) pulled out, the infrared sensor located at the vase opening detects the pull-out of the flower(s), generates a flower pull-out signal and transmits the flower pull-out signal to the flower recognition device 3, such that the flower recognition device 3 stops playing the presentation information of the flower(s).

One or more embodiments of the present disclosure provide a flower recognition and presentation method for an intelligent vase system.

Figure 5:
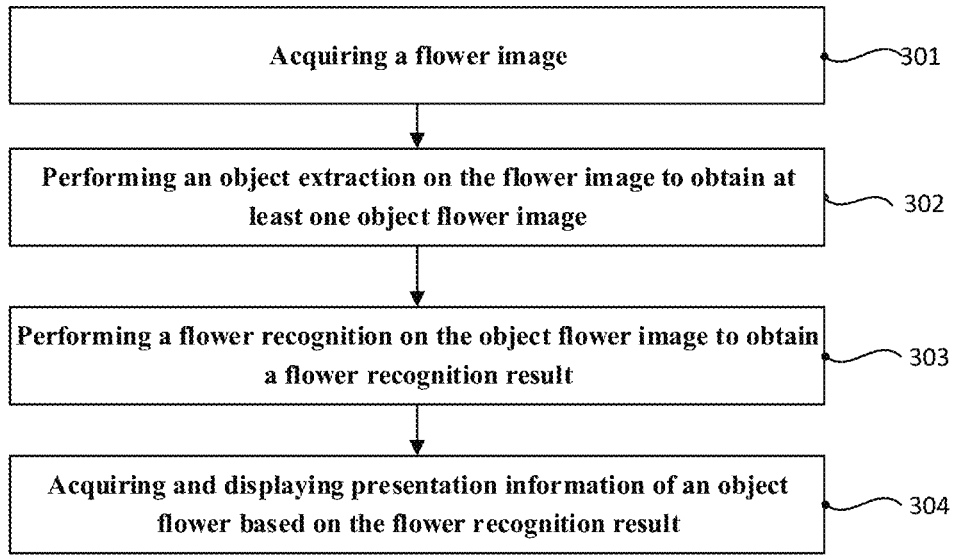
FIG. 5 is a schematic flowchart illustrating a flower recognition and presentation method for an intelligent vase system according to one or more embodiments of the present disclosure.

FIG. 5 is a schematic flowchart illustrating a flower recognition and presentation method for an intelligent vase system according to one or more embodiments of the present disclosure. As shown in FIG. 5, the method includes the following steps 301 to 304.

Step 301 includes acquiring flower image(s).

Step 302 includes performing an object extraction on the flower image(s) to obtain at least one object flower image.

Step 303 includes performing a flower recognition on the object flower image to obtain a flower recognition result.

Step 304 includes acquiring and displaying presentation information of an object flower based on the flower recognition result.

In this embodiment, by acquiring flower image(s), performing an object extraction, performing a flower recognition, and obtaining the flower recognition result such as the kind of flower(s); based on the flower recognition result, obtain presentation information that is used for introducing the flower(s), such as an image, a text, a video, etc., which is sent to the display device for display. In this way, the flower(s) held in the vase may be comprehensively presented in an image, a text, a video, etc., such that the intelligent vase in this embodiment may meet the requirements of flower presentation in large-scale public places such as hotels, banks, exhibition halls and the like, and thereby improving the target value proposition, and attracting the flow.

The object extraction and the flower recognition may be realized only by the flower recognition device 3 mounted on the vase body. In this case, the flower recognition device 3 includes a processor, a memory, etc., wherein the memory stores a large amount of flower information, and the processor extracts the object flower image, and then obtains the corresponding flower presentation information from the memory and transmits the flower presentation information to the display device for display.

The flower recognition device 3 in this embodiment may alternatively include the terminal device 6 and the server 5, where the terminal device 6 obtains the flower image and then performs object extraction on the flower image, transmits the extracted object flower image to the server 5 for flower recognition, and transmits the obtained presentation information of the object flower to the display device for display; or the terminal device 6 transmits the acquired flower image directly to the server for object extraction and flower recognition.

Optionally, the step 302 of performing an object extraction on the flower image(s) to obtain at least one object flower image includes the following steps 401 to 404.

Step 401 includes processing the flower image(s) to obtain a gray image.

Step 402 includes performing a threshold segmentation and a binarization processing on the gray image to obtain a binary image.

Specifically, in the present embodiment, the gray image is segmented based on a threshold; a pixel gray of each pixel of the gray image is acquired; the pixel gray of each pixel is compared with the threshold; if the pixel gray of the pixel is larger than the threshold, the pixel gray of the pixel is set as a first gray value; and if the pixel gray of the pixel is smaller than the threshold, the pixel gray of the pixel is set as a second gray value, thereby obtaining the binary image. The first gray value is 255 and the second gray value is 0, or the first gray value is 0 and the second gray value is 255.

The step of performing a threshold segmentation on the gray image includes: segmenting the gray image according to an optimal threshold.

In an embodiment of the present disclosure, the optimal threshold is obtained by the following steps 501 to 504.

Step 501 includes segmenting the gray image into an object area and a background area according to an initial threshold.

Step 502 includes calculating an object area pixel gray average value of the object area, a background area pixel gray average value of the background area, and a full image pixel gray average value of the gray image.

Step 503 includes calculating a pixel variance between the object area and the background area according to the object area pixel gray average value, the background area pixel gray average value and the full image pixel gray average value.

Step 504 includes updating the initial threshold and recalculating the pixel variance, and selecting a threshold with the maximum pixel variance as the optimal threshold.

In this embodiment, if the object area pixel gray average value, the background area pixel gray average value and the full image pixel gray average value, which are obtained by segmenting based on a threshold, have the largest difference among them, and the segmentation result causes object bright point areas (for example, white point areas) to be relatively concentrated, the threshold is the optimal threshold. The segmentation is performed based on the optimal threshold to obtain the binary image, and subsequent processing is performed based on the binary image.

Step 403 includes acquiring at least one connected domain in the binary image.

In this embodiment, the object flower image may be determined by determining an approximate area for a single posy in the flower image by using a four neighborhood connected-domain approach.

Step 404 includes calculating a central position coordinate of the connected domain, and marking the object flower image in the flower image based on the central position coordinate.

In this embodiment, the maximum connected domain is selected as a reference, connected domains smaller than a preset percentage of the maximum connected domain are filtered out (in this embodiment, the preset percentage is 35%), and the remaining connected domains are segmented from the image, so as to obtain an object image corresponding to each connected domain. Then, a central position of the object image corresponding to each connected domain is calculated, to obtain the central position coordinate; the central position coordinate is combined with an original flower image; an expansion display through a 4×4 matrix is finally performed, to obtain a final object flower image; and the object flower image is marked on the display device through a rectangular frame.

Optionally, after step 404, namely, after marking and displaying the object flower image in the flower image based on the central position coordinate, the method further includes: performing the flower recognition on the current object flower image in response to a confirmation instruction from the user; or acquiring the flower image again in response to a return instruction from the user, and extracting the object flower image. That is, in the present embodiment, when the bouquet inserted into the vase includes a plurality of kinds of flowers, the plurality of kinds of flowers may also be marked in the object flower image. If the object flower image marked currently meets the requirements of the user, the user may operate to perform the flower recognition. If the object flower image does not include all kinds of flower or flower types that are interested by the user, it is necessary to repeat shooting the bouquet by adjusting a shooting angle to obtain the flower image and extract the object flower image again.

Optionally, the step of performing a flower recognition on the object flower image to obtain a flower recognition result, that is, step 303, includes: obtaining the flower recognition result according to the object flower image and a pre-trained flower recognition model.

In some optional implementations of the embodiment, the flower recognition model may be obtained by training a preset Convolutional Neural Network (CNN). The convolutional neural network may be an untrained multi-layer convolutional neural network or a multi-layer convolutional neural network which has not been completely trained. The convolutional neural network may include, for example, a convolution layer, a pooling layer, a fully-connected layer, and a loss layer. Additionally, a convolution layer other than the first convolution layer in the convolutional neural network may be connected to at least one convolution layer located before the convolution layer. For example, the convolution layer other than the first convolution layer may be connected to all convolution layers located before the convolution layer, to implement a selection for the first convolution layer; or the convolution layer other than the first convolution layer may also be connected to some convolution layers located before the convolution layer.

Optionally, the step of acquiring and displaying presentation information of an object flower based on the flower recognition result, that is, step 304, includes steps of: acquiring flower video presentation information and flower text presentation information according to the flower recognition result; and transmitting the flower video presentation information and the flower text presentation information to different display devices for display.

Optionally, the flower recognition and presentation method for the intelligent vase system further includes steps of: generating a rotation control instruction and transmitting the rotation control instruction to the motor, so that the motor controls the turntable to rotate based on the rotation control instruction to realize the rotation of the vase body.

Optionally, the flower recognition and presentation method for the intelligent vase system further includes steps of: acquiring an insertion or pull-out state of a flower, and generating a control signal according to the insertion or pull-out state, so as to control the playing and stopping of the presentation information.

It should be noted that the method according to one or more embodiments of the present disclosure may be performed by a single apparatus, such as a computer or server. The method may alternatively be applied to a distributed scenario and is completed by a plurality of apparatuses in cooperation. In such a distributed scenario, one of the plurality of apparatuses may only perform one or more steps of the method according to one or more embodiments of the present disclosure, and the plurality of apparatuses may interact with each other to complete the method.

The specific embodiments of the present disclosure have been described. Other embodiments are within the scope of the appended claims. In some cases, the actions or steps recited in the claims may be performed in a different order than in the embodiments and still achieve desirable results. In addition, the processes depicted in the accompanying drawings do not necessarily require the particular order shown, or sequential order, to achieve desirable results. In some embodiments, multitasking and parallel processing may also be possible or may be advantageous.

One or more embodiments of the present disclosure provide an electronic apparatus, which includes a memory, a processor, and a computer program stored in the memory and executable on the processor. When the processor executes the program, the flower recognition and presentation method for the intelligent vase system according to any one of the foregoing embodiments is implemented.

Figure 6:
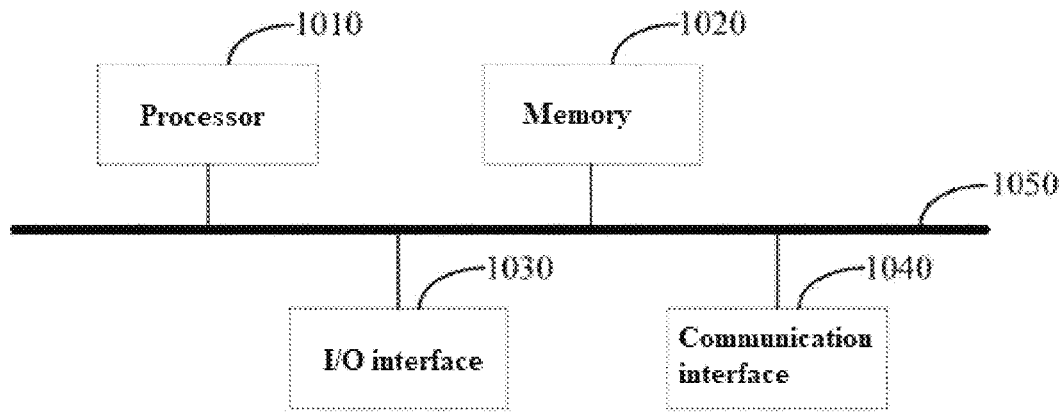
FIG. 6 is a schematic diagram of a structure of hardware of an electronic apparatus according to one or more embodiments of the present disclosure.
Figure 7:
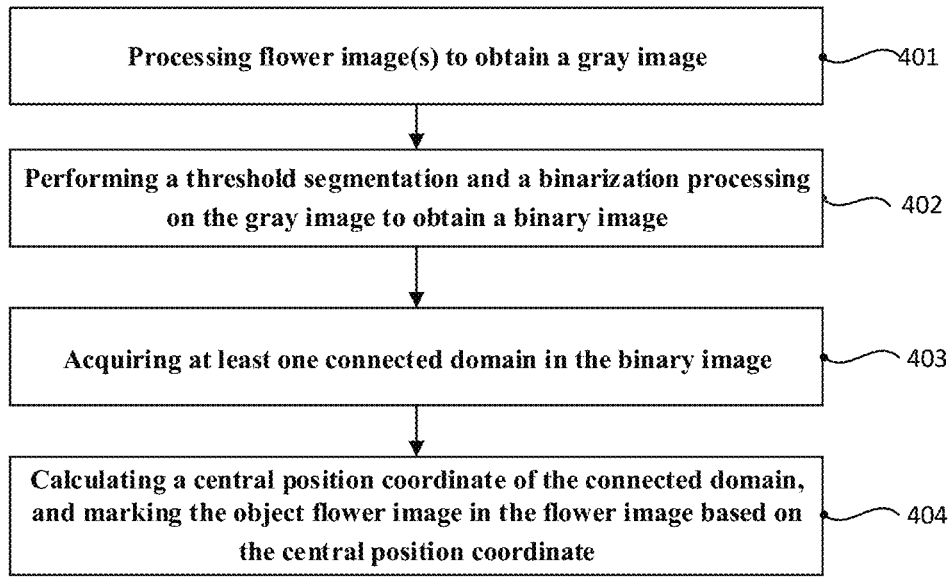
FIG. 7 is a schematic flowchart illustrating sub-steps of step 302 as shown in FIG. 5.
Figure 8:
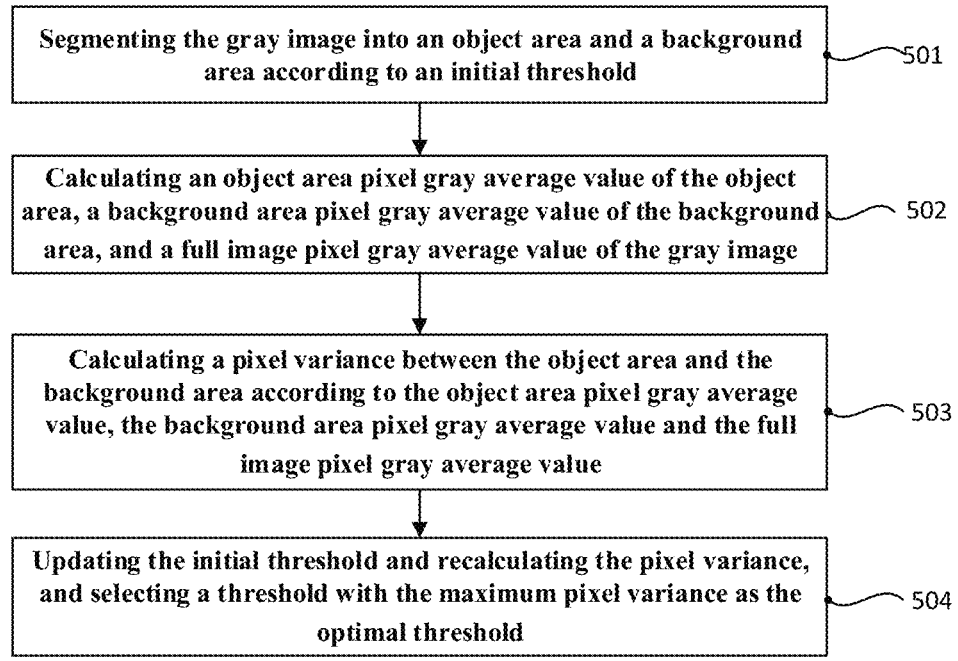
FIG. 8 is a schematic flowchart illustrating a method for obtaining the optimal threshold.

FIG. 6 is a schematic diagram of a structure of hardware of an electronic apparatus according to one or more embodiments of the present disclosure. As shown in FIG. 6, the electronic apparatus 1000 may include: a processor 1010, a memory 1020, an input/output (I/O) interface 1030, a communication interface 1040, and a bus 1050. The processor 1010, the memory 1020, the input/output interface 1030, and the communication interface 1040 are communicatively connected to each other within the electronic apparatus via the bus 1050.

The processor 1010 may be implemented by a general-purpose CPU (Central Processing Unit), a microprocessor, an Application Specific Integrated Circuit (ASIC), or one or more integrated circuits, and is configured to execute related programs to implement the flower recognition and presentation method for the intelligent vase system according to any one of the foregoing embodiments.

The memory 1020 may be implemented by an ROM (Read Only Memory), an RAM (Random Access Memory), a static memory device, a dynamic memory device, or the like. The memory 1020 may store an operating system and other application programs, and when the flower recognition and presentation method for the intelligent vase system according to any one of the foregoing embodiments is implemented by software or firmware, relevant program codes are stored in the memory 1020 and invoked and executed by the processor 1010.

The input/output interface 1030 is connected to an input/output unit to input and output information. The input/output unit may be disposed as a component in the electronic apparatus (not shown) or may be externally connected to the electronic apparatus to provide functions. The input unit may include a keyboard, a mouse, a touch screen, a microphone, various sensors, etc., and the output unit may include a display, a speaker, a vibrator, an indicator light, etc.

The communication interface 1040 is connected to a communication unit (not shown) to implement communication interaction between the electronic apparatus and other devices. The communication unit may realize communication in a wired mode (for example, USB, network cable, etc.), or in a wireless mode (for example, mobile network, WIFI, Bluetooth, etc.).

The bus 1050 is configured to transmit information between various components of the electronic apparatus, such as the processor 1010, the memory 1020, the input/output interface 1030, and the communication interface 1040.

It should be noted that although only the processor 1010, the memory 1020, the input/output interface 1030, the communication interface 1040 and the bus 1050 are shown, in a specific implementation, the electronic apparatus may also include other components necessary for normal operation. In addition, it may be understood by one of ordinary skill in the art that the electronic apparatus may also include only the components necessary for implementing the flower recognition and presentation method for the intelligent vase system according to any one of the foregoing embodiments of the present disclosure, but not necessarily include all the components shown in the drawings.

The present embodiment of the present disclosure also provides a non-transitory computer-readable storage medium, on which computer-executable instructions are stored, wherein the instructions, when executed by a processor, implement the flower recognition and presentation method for the intelligent vase system.

One of ordinary skill in the art will understand that: the discussion of any one of the foregoing embodiments is merely exemplary, and is not intended to imply that the scope of the present disclosure, including the claims, is limited to these examples. Under the inventive concepts of the present disclosure, features from the above embodiments or different embodiments may also be combined with each other, the steps may be performed in any order, and there are many other variations in different aspects of one or more foregoing embodiments of the present disclosure, which are not provided in detail for the sake of brevity.

The flowchart and block diagrams in the drawings illustrate the architecture, functionality, and operation of possible implementations of systems, methods and electronic apparatuses according to various embodiments of the present disclosure. In this regard, each block in the flowchart or block diagrams may represent a unit, a segment of a program, or a portion of codes, which includes at least one executable instruction for implementing the specified logical function(s). It should also be noted that, in some alternative implementations, the functions noted in the blocks may occur out of the order shown in the drawings. For example, two blocks shown in succession may, in fact, be executed substantially concurrently, or may sometimes be executed in the reverse order, depending upon the functionality involved. It will also be noted that each block of the block diagrams and/or flowchart, and combinations of blocks in the block diagrams and/or flowchart, may be implemented by special purpose hardware-based systems that perform the specified functions or operations, or by combinations of special purpose hardware and computer instructions.

The components involved in the embodiments of the present disclosure may be implemented by software or hardware. The described components may also be provided in a processor, for example, each of the components may be a software program provided in a computer or a mobile intelligent apparatus, or may be a separately configured hardware device. Names of the components may not limit the components themselves in some way.

In addition, for simplicity of illustration and discussion, well-known power/ground connections to Integrated Circuit (IC) chips and other components may or may not be shown in the provided drawings, so as not to obscure one or more embodiments of the present disclosure. Furthermore, a device may be shown in a block diagram, in order to avoid obscuring one or more embodiments of the present disclosure, and this also takes into account the following fact: details regarding the implementation of such a device shown in the block diagram are highly dependent upon the platform within which the one or more embodiments of the present disclosure are to be implemented (i.e., details should be well within purview of one skilled in the art). Where specific details (e.g., circuits) are set forth in order to describe exemplary embodiments of the present disclosure, it should be apparent to one skilled in the art that one or more embodiments of the present disclosure may be practiced without, or with variation of, these specific details. Accordingly, the description is to be regarded as being illustrative instead of being restrictive.

While the present disclosure has been described in conjunction with specific embodiments thereof, many alternatives, modifications, and variations thereof will be apparent to one of ordinary skill in the art in light of the foregoing description. For example, other memory architectures (e.g., dynamic RAM (DRAM)) may be adopted in the embodiments discussed.

The one or more embodiments of the present disclosure are intended to embrace all such alternatives, modifications and variances which fall within the broad scope of the appended claims. Accordingly, any omissions, modifications, substitutions, improvements, and the like, that may be made without departing from the spirit or scope of the foregoing embodiments of the present disclosure, are intended to be included within the scope of the present disclosure.

What is claimed is:

1. An intelligent vase system, comprising:
a vase body;
a flower recognition device configured to:
acquire a flower image of a flower inserted into the vase body;
perform an object extraction on the flower image to obtain at least one object flower image;
perform a flower recognition on the object flower image to obtain a flower recognition result; and
acquire presentation information of an object flower based on the flower recognition result; and
a display device, which is on the vase body, in communication with the flower recognition device, and configured to display the presentation information.

2. The intelligent vase system of claim 1, further comprising a camera, which is on the vase body, in communication with the flower recognition device, and configured to capture the flower image of the flower inserted into the vase body and transmit the flower image to the flower recognition device.

3. The intelligent vase system of claim 1, wherein the flower recognition device is further configured to:
process the flower image to obtain a gray image;
perform a threshold segmentation and a binarization processing on the gray image to obtain a binary image;
acquire at least one connected domain in the binary image; and
calculate a central position coordinate of the connected domain, and in the flower image, mark an area of the object flower image relative to the flower image based on the central position coordinate.

4. The intelligent vase system of claim 3, wherein the flower recognition device is further configured to: segment the gray image according to an optimal threshold.

5. The intelligent vase system of claim 4, wherein to obtain the optimal threshold, the flower recognition device is further configured to:
segment the gray image into an object area and a background area according to an initial threshold;
calculate an object area pixel gray average value of the object area, a background area pixel gray average value of the background area, and a full image pixel gray average value of the gray image;
calculate a pixel variance between the object area and the background area according to the object area pixel gray average value, the background area pixel gray average value and the full image pixel gray average value; and
change the initial threshold and recalculate the pixel variance, and select a threshold with a maximum pixel variance as the optimal threshold.

6. The intelligent vase system of claim 1, wherein the flower recognition device is further configured to:
perform the flower recognition on the object flower image in response to a confirmation instruction from a user; or
acquire the flower image again in response to a return instruction from a user, and extract the object flower image.

7. The intelligent vase system of claim 1, wherein the flower recognition device is further configured to:
obtain the flower recognition result according to the object flower image and a pre-trained flower recognition model.

8. The intelligent vase system of claim 7, wherein to obtain the pre-trained flower recognition model, the flower recognition device is further configured to:
acquire a sample image set and a label corresponding to each sample image in the sample image set; wherein the sample image set comprises a sample image with flowers displayed thereon; and
train a preset convolutional neural network by using a machine learning method based on the sample image set, the label corresponding to each sample image in the sample image set, a preset classification loss function and a preset back propagation algorithm, to obtain the flower recognition model.

9. The intelligent vase system of claim 8, wherein the flower recognition device is further configured to:
acquire a plurality of initial sample images;
preprocess the initial sample images by using a data standardization method, to obtain sample images; and
construct the sample image set according to the sample images.

10. The intelligent vase system of claim 1, wherein the presentation information comprises flower video presentation information and flower text presentation information; and
the flower recognition device is further configured to:
transmit the flower video presentation information and the flower text presentation information to different display devices for display.

11. The intelligent vase system of claim 1, further comprising:
a turntable on a bottom of the vase body; and
a motor, which is connected to the turntable, in communication with the flower recognition device, and configured to receive a rotation control instruction generated by the flower recognition device and drive the turntable to rotate based on the rotation control instruction, so as to realize rotation of the vase body.

12. The intelligent vase system of claim 1, further comprising:
an infrared sensor inside a vase opening of the vase body, in communication with the flower recognition device, and configured to collect an insertion or pull-out state of the flower, generate a corresponding signal and transmit the signal to the flower recognition device, so that the flower recognition device generates a control signal according to the signal indicating the insertion or pull-out state to control playing of the presentation information.

13. A flower recognition and presentation method for an intelligent vase system, the intelligent vase system being the intelligent vase system of claim 1, the flower recognition and presentation method comprising: acquiring, by the flower recognition device, the flower image of a flower inserted into the vase body;
performing, by the flower recognition device, the object extraction on the flower image to obtain at least one object flower image;
performing, by the flower recognition device, the flower recognition on the object flower image to obtain a flower recognition result;
acquiring, by the flower recognition device, presentation information of the object flower based on the flower recognition result and transmitting the presentation information to the display device; and
displaying the presentation information on the display device.

14. The flower recognition and presentation method of claim 13, further comprising: collecting, by a camera, the flower image of the flower inserted into the vase body; and transmitting the flower image to the flower recognition device.

15. The flower recognition and presentation method of claim 13, wherein the performing an object extraction on the flower image to obtain at least one object flower image comprises:
processing the flower image to obtain a gray image;
performing a threshold segmentation and a binarization processing on the gray image to obtain a binary image;
acquiring at least one connected domain in the binary image; and
calculating a central position coordinate of the connected domain, and in the flower image, marking an area of the object flower image relative to the flower image based on the central position coordinate.

16. The flower recognition and presentation method of claim 15, wherein the performing a threshold segmentation on the gray image comprises: segmenting the gray image according to an optimal threshold.

17. The flower recognition and presentation method of claim 16, further comprising:
segmenting the gray image into an object area and a background area according to an initial threshold;
calculating an object area pixel gray average value of the object area, a background area pixel gray average value of the background area, and a full image pixel gray average value of the gray image;
calculating a pixel variance between the object area and the background area according to the object area pixel gray average value, the background area pixel gray average value and the full image pixel gray average value; and
changing the initial threshold and recalculate the pixel variance, and selecting a threshold with a maximum pixel variance as the optimal threshold.

18. The flower recognition and presentation method of claim 13, further comprising:
performing the flower recognition on the object flower image in response to a confirmation instruction from a user; or
acquiring the flower image again in response to a return instruction from a user, and extracting the object flower image.

19. The flower recognition and presentation method of claim 13, wherein the performing a flower recognition on the object flower image to obtain a flower recognition result comprises: obtaining the flower recognition result according to the object flower image and a pre-trained flower recognition model;
the flower recognition and presentation method further comprising: acquiring a sample image set and a label corresponding to each sample image in the sample image set; wherein the sample image set comprises a sample image with flowers displayed thereon; and training a preset convolutional neural network by using a machine learning method based on the sample image set, the label corresponding to each sample image in the sample image set, a preset classification loss function and a preset back propagation algorithm, to obtain the flower recognition model;
wherein the acquiring the sample image set comprises: acquiring a plurality of initial sample images; preprocessing the initial sample images by using a data standardization method, to obtain sample images; and constructing the sample image set according to the sample images; and
wherein the acquiring presentation information of the object flower based on the flower recognition result comprises: acquiring flower video presentation information and flower text presentation information according to the flower recognition result; and transmitting the flower video presentation information and the flower text presentation information to different display devices for display.

20. An electronic apparatus, comprising a memory, a processor, and a computer program stored on the memory and executable on the processor, wherein the computer program, when executed by the processor, implements the flower recognition and presentation method for an intelligent vase system of claim 13.

* * * * *